United States Patent
Thornton et al.

(10) Patent No.: US 9,014,928 B2
(45) Date of Patent: Apr. 21, 2015

(54) TRANSMISSION GEARSHIFT CONTROL (71) Applicant: Ford Global Technologies, LLC, Dearborn, MI (US)

(72) Inventors: Sarah M. Thornton, Sacramento, CA (US); Diana Yanakiev, Birmingham, MI (US); Anuradha Annaswamy, W. Newton, MA (US); Gregory M. Pietron, Canton, MI (US); Bradley D. Riedle, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/036,316

(22) Filed: Sep. 25, 2013

(65) Prior Publication Data

US 2014/0224054 A1 Aug. 14, 2014

Related U.S. Application Data (63) Continuation-in-part of application No. 13/766,829, filed on Feb. 14, 2013, now Pat. No. 8,788,159.

(51) Int. Cl.
*G06F 7/00* (2006.01)
*F16H 61/00* (2006.01)
*F16H 59/02* (2006.01)

(52) U.S. Cl.
CPC ........... *F16H 59/02* (2013.01); *Y10T 74/20024* (2013.01); *F16H 61/0021* (2013.01)

(58) Field of Classification Search
USPC ...................................... 701/51; 477/173, 143
See application file for complete search history.

(56) References Cited

U.S. PATENT DOCUMENTS

| | | | | |
|---|---|---|---|---|
| 5,128,868 A * | 7/1992 | Imai et al. | ........................ | 701/51 |
| 5,743,826 A * | 4/1998 | Usuki et al. | ...................... | 477/98 |
| 6,299,565 B1 * | 10/2001 | Jain et al. | ........................ | 477/143 |
| 6,385,520 B1 * | 5/2002 | Jain et al. | ........................ | 701/51 |
| 7,104,380 B2 * | 9/2006 | Bishop et al. | ............... | 192/85.32 |
| 7,849,842 B1 * | 12/2010 | Lewis et al. | .................... | 123/575 |
| 8,467,947 B2 * | 6/2013 | Zollner et al. | ................... | 701/66 |
| 2006/0054444 A1 * | 3/2006 | Bishop et al. | ............. | 192/85 AA |
| 2011/0144846 A1 * | 6/2011 | Zollner et al. | .................. | 701/22 |

* cited by examiner

*Primary Examiner* — Thomas G Black
*Assistant Examiner* — Tyler Paige
(74) *Attorney, Agent, or Firm* — James Dottavio; MacMillan, Sobanski & Todd, LLC (57) ABSTRACT

A method for controlling cylinder pressure producing piston displacement for actuating a control element of an automatic transmission during a gearshift, includes (a) applying boost pressure to the to the control valve controlling the piston, provided one of the following conditions is present a boost phase is unexpired, cylinder pressure is less than a desired pressure, and piston displacement exceeds a desired displacement; (b) applying stroke pressure to the cylinder provided piston displacement away from control element plates occurs; and (c) increasing stroke pressure provided piston displacement away from clutch plates has not occurred.

17 Claims, 5 Drawing Sheets

TRANSMISSION GEARSHIFT CONTROL

CROSS REFERENCE TO RELATED APPLICATIONS

This is a continuation-in-part application of pending U.S. application Ser. No. 13/766,829, filed Feb. 14, 2013.

BACKGROUND OF THE INVENTION

1. Field of the Invention

This invention relates generally to control of a gearshift produced by an automatic transmission, particularly to the early stages of a synchronous gearshift.

2. Description of the Prior Art

A hydraulically-actuated transmission clutch features nonlinear dynamic response in the early stages of its application. There is no on-board feedback signal that indicates the clutch state (e.g., piston position), until the clutch acquires torque transmitting capacity. The control algorithm commands the pressure at a control valve that is remotely located with respect to the clutch cylinder and piston. Open-loop boost and stroke pressure commands to the valve are used to control the clutch in these early stages. The duration of boost and the level of stroke pressure can be adapted in subsequent shifts, but imperfect shifts usually occur first, in order to invoke adaptation.

Knowing input shaft torque or output shaft torque is beneficial for improving the quality of gear shift control of an automatic transmission for a vehicle. Measurement of input shaft torque or output shaft torque allows feedback control that is more robust to unknown disturbances to be utilized. However, the conventional approach of error-based closed-loop (CL) control has limited authority during fast transients in the torque-transfer phase of a gearshift due to the clutch actuators' considerable nonlinearity, delay and lag.

A method for determining clutch torques during a gearshift using references to input and output shaft torque measurements or estimates has provided multiple opportunities for improving shift control exist. While the off-going clutch torque signal and on-coming clutch torque signal provide valuable feedback, essential for changing the whole paradigm of synchronous torque transfer control, that feedback is still not available during the initial phases of clutch actuation.

The clutch has torque carrying capacity only after certain nonlinear dynamic transients in the clutch actuator take place and, unfortunately, there is no feedback information during that transient response. To be able to command the clutch actuator during those initial phases in a robust fashion, knowledge of the internal state of the actuator would be essential.

SUMMARY OF THE INVENTION

A method for controlling cylinder pressure producing piston displacement for actuating a control element of an automatic transmission during a gearshift, includes (a) applying boost pressure to the to the control valve controlling the piston, provided one of the following conditions is present a boost phase is unexpired, cylinder pressure is less than a desired pressure, and piston displacement exceeds a desired displacement; (b) applying stroke pressure to the cylinder provided piston displacement away from control element plates occurs; and (c) increasing stroke pressure provided piston displacement away from clutch plates has not occurred.

The adaptive clutch model allows for an internal estimate of the clutch piston position, which is used as the feedback signal for boost control and stroke control phases. Instead of a calibrated duration, the boost phase runs until the internal model variable indicates that stroke pressure is approaching. Similarly, the internal model variable is used to control the clutch to reaching stroke pressure gracefully, without the undesired consequences of understroking or overstroking.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
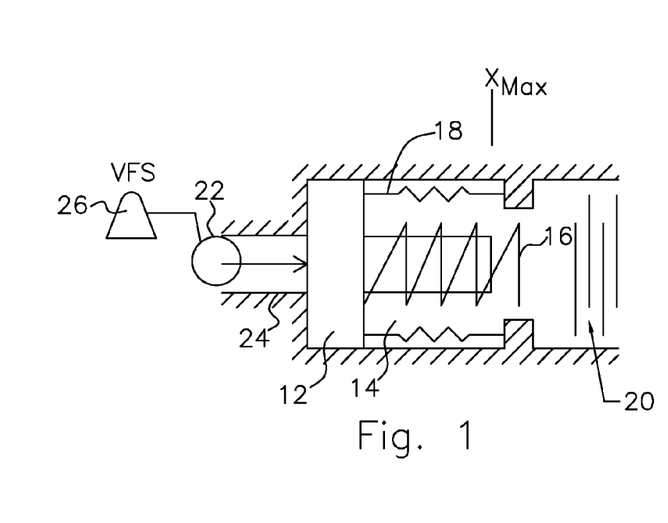
FIGS. 1-4 are schematic diagrams showing the clutch actuation by regions.

FIG. 1 provides insight about a conventional hydraulically-actuated clutch 10 used in an automatic transmission. The clutch piston 12, located in a hydraulic cylinder 14, is being pushed rightward by the hydraulic pressure supplied to the cylinder. Piston 12 first compresses two springs 16, 18 as it moves rightward to compress the clutch friction plates 20. The outer return spring 18 is preloaded and pushes the piston 12 away from the clutch plates 20 when the clutch 10 is commanded open. The inner, isolation or cushion spring 16 is optional and it provides resistance to the piston 12 touching the plates in the initial stage of that transient.

Actuation of piston 12 is divided into four regions according to the position of the clutch piston position. In region 1 illustrated in FIG. 1, the clutch piston 12 is at its maximum distance $X_{max}$ from the friction plates 20. Transmission fluid pressurizes the lines and overcomes the pre-load of return spring 18, while the isolation spring 16 is uncompressed.

Figure 2:
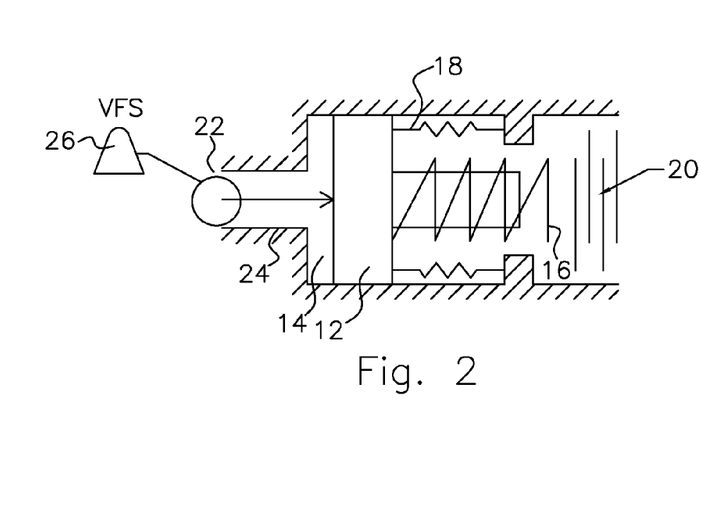

In region 2 illustrated in FIG. 2, transmission fluid fills the clutch cylinder 14 and moves the clutch piston 12 rightward while compressing the return spring 18.

Figure 3:
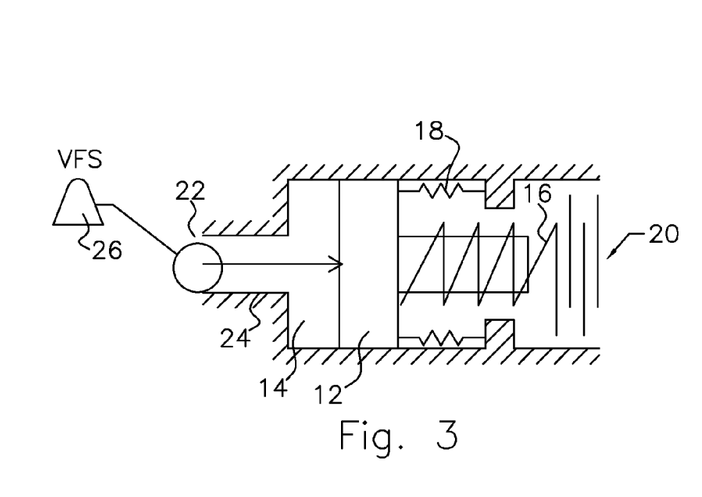

In region 3 illustrated in FIG. 3, transmission fluid continues to fill the clutch cylinder 14. The isolation spring 16 compresses against the friction plates 20 as the clutch piston 12 continues moving rightward. The torque transfer phase of the gearshift begins and the clutch gains some torque transmitting capacity as the friction plates begin to engage mutually.

Figure 4:
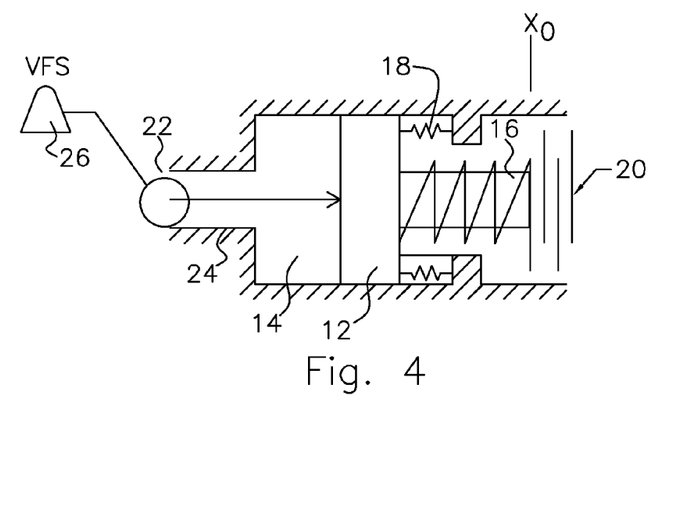

In region 4 illustrated in FIG. 4, the clutch piston 12 stops traveling and touches the rightmost friction plate of clutch 20 when the clutch plates are in mutual contact. Clutch torque capacity increases as the friction plates continue engaging. The clutch pressure and torque capacity can be related linearly here. Within region 4, the torque transfer phase of the gearshift ceases and the inertia transfer phase of the gearshift occurs.

Although reference is made to the transmission control element being a clutch, the control element may be a brake. A clutch alternately connects and disconnection rotating members of the transmission, whereas a brake alternately connects and disconnection a rotating member of the transmission to a non-rotating component such a transmission housing.

The off-going clutch control and on-coming clutch control during synchronous gearshifts has no on-board sensing that provides feedback about the response of those clutches before the gearbox speed measurements start changing. For a synchronous power-on upshift, for example, there is no feedback during the initial actuation of the clutches and through the torque transfer phase of the gearshift. Only after the speed ratio change commences at some time during region 4, is the real-time controller able to issue its commands based on feedback information.

With the introduction of torque measurement or estimation, that problem is alleviated, since clutch torque feedback is available as soon as the on-coming clutch starts gaining torque capacity, i.e., at the beginning of region 3, as described above. Even then, since shaft twist can be greatly affected by powertrain-induced or external disturbances, the linear relationship between clutch actuation and the torque signal may not be consistent instantaneously.

Line pressurization and return spring compression during regions 1 and 2 remain without any feedback. It is evident from the balance of forces that, if the hydraulic pressure applied to piston 12 is not sufficient to overcome the force of return spring 18, the clutch 10 can remain in the first or second region indefinitely. However, if too much pressure is applied, the piston 12 can progress too rapidly to engage the clutch plates and significant disturbance to the driveline can occur. Hence, knowing the pressure that results in the beginning of region 3, commonly referred as "stroke" pressure, is key. While stroke pressure would be constant for the ideal case of no part-to-part or environmental variations, in reality stroke pressure varies. Stroke pressure is one of the important parameters that a transmission controller would try to adapt. Unfortunately, speed (or even pressure, if that were available) feedback signals do not provide opportunity to adjust that in time to avoid a bad gearshift.

Another factor in the control strategy can be introduced with the so-called "boost phase." Boost is commonly employed to speed the response in the initial phases (regions 1 and 2), by commanding a higher pressure at the solenoid actuator until the clutch pressure gets close to "stroke" pressure. Since neither stroke pressure nor measured actual pressure at the piston 12 are known, the boost phase duration is a calibrated parameter that is adapted from shift-to-shift. Again, the wrong boost duration can cause a bad shift, without the opportunity to correct as it happens.

A production-suitable magneto-elastic shaft torque sensor has been developed and is described in U.S. Patent Application Publication Number 20100318269, the entire disclosure of which is incorporated herein by reference. That torque sensor's ability to measure torque directly at the transmission input or output shaft enables many features in vehicle control. Its dynamic response is within a fraction of a millisecond and its accuracy is far superior to any currently available on-board torque estimates. The clutch torque calculation based on these measurements would provide feedback signal about the clutch actuation as soon as the beginning of region 3.

The clutch model determines the movement of piston 12 as a result of the force balance between the pressure in cylinder 14, and the forces of springs 16, 18. This transient spans regions 2 and 3 in FIG. 1. The initial pressurization in region 1 can be successfully captured with a system identification model, as well as the fast-dynamics region 4, which has additional feedback information.

The availability of the clutch torque signal in region 3, allows online adaptation of the clutch model parameters, to ensure better representation of region 1 and 2 transients during subsequent shifts. However, the need to use and adapt "boost duration" is eliminated and the adaptation of "stroke pressure" can occur during the gearshift, rather than after the gearshift.

Physical Model Description

Regions 2 and 3 define the part of the clutch actuation wherein the piston 12 moves between the bounds of $x_{max}$ and $x_0$. As FIG. 1 shows, the origin of piston displacement xo is located at the right-hand side of cylinder 14 with each disc of the control element 20 touching another disc. The maximum piston displacement xmax is shown in FIG. 1. Newtonian dynamics to model the clutch piston movement, we have $$\text{if } (x \leq x_{free}) \quad (1)$$
$$x_{contact} = 1$$
$$\text{else}$$
$$x_{contact} = 0$$
$$\text{end}$$
$$\ddot{x} = \frac{1}{m}(PA + Kx - F_0 - x_{contact}(x_{free} - x)K_{is} - c\dot{x}).$$

where $\ddot{x}$ is the clutch piston acceleration, m is the mass of the clutch piston 12, P is the pressure in cylinder 14, A is the cross-sectional area of the clutch apply piston 12, K is the coefficient of return spring 18, x is the clutch piston position, $F_0$ is the pre-load of return spring 18, $x_{contact}$ is 0 or 1 depending on whether the clutch piston 12 is in region 2 or region 3, $x_{free}$ is the height or free length of the isolation spring 16, $K_{is}$ is the coefficient of isolation of spring 18, c is the damping coefficient, and $\dot{x}$ is the clutch piston velocity.

However, we assume the flow of the transmission fluid through the clutch body is quasi-static. Thus, $\ddot{x}$ and $\dot{x}$ are small, and Eq. (1) becomes $$P = \frac{1}{A}(F_0 - Kx + x_{contact}(x_{free} - x)K_{is}) \quad (2)$$

Note that when $x = x_{max}$, $$P = \frac{1}{A}(F_0 - Kx) \quad (3)$$

and when $x = x_0$, $$P = \frac{1}{A}(F_0 + x_{free}K_{is}) \quad (4)$$

Equations (3) and (4) become the lower bound and upper bound, respectively, of the model output pressure for regions 2 and 3, which can be used to help tune the initial model parameters.

To relate the control input, u, to the model output pressure, P, we choose the clutch piston position, x, as the state. The clutch piston position is modeled using a flow equation of the pressure drop between a regulator valve 22 and the clutch 20.

The regulator valve 22 is located on the hydraulic line 24 between a variable force solenoid 26, which provides the commanded pressure, and clutch 10. Assuming there is no saturation of the regulator valve, we have $$\Delta P = u - P \quad (5)$$

$$Q = K_1 \Delta P + K_2 \sqrt{\Delta P} \quad (6)$$

$$x = x_{max} - \frac{1}{A} \int Q dt \quad (7)$$

where $\Delta P$ is the difference in commanded and output pressure, Q is the flow rate, $K_1$ is the laminar flow coefficient, and $K_2$ is the turbulent flow coefficient.

The flow coefficients are most suitable for tuning the model, since the other model parameters are geometric. As $K_1$ and $K_2$ vary, the desired output response is tuned. For example, in the case of mostly laminar flow, or low $\Delta P$, the flow coefficients may be chosen to be relatively slow. Also, the difference between $K_1$ and $K_2$ should be considered in order to tune the duration the model is within region 2 or region 3.

Example Algorithms (Model) Description

Region 1

For the first region, if the clutch piston 12 was held at its maximum position and pressure was allowed to build up to a commanded step input, the output pressure would be a second order response. However, the clutch piston moves once the hydraulic pressure overcomes the pre-load of the return spring. As a result, the second order response is interrupted and the actual response for this region looks like an unstable first order response. Since a dynamic model of the true region 1 response would be difficult to tune and align for the initial condition of region 2, we assume the region 1 model to be constant, and defined as $$P \equiv \text{constant} = \frac{1}{A}(F_0 - K * x_{max}) \quad (9)$$

The duration of region 1 is dependent on the temperature of the transmission fluid.

Region 2

Using the condition from Eq. (1), $x_{contact}=0$, and Eq. (2) becomes $$P = \frac{1}{A}(F_0 - Kx) \quad (10)$$

Region 3

Again, using the condition from Eq. (1), $x_{contact}=1$, and Eq. (2) becomes $$P = \frac{1}{A}(F_0 + K_{is}x_{free} - (K + K_{is})x), \quad (11)$$

where x is defined by Eq. (7).

Region 4

Once the clutch piston no longer travels, the dynamics of the hydraulic actuation system are no longer present. The pressure response to command is almost instantaneous, and can be represented with a first order transfer function featuring a time constant $T_p$ and a time delay $T_d$.

$$\frac{P}{u}(s) = \frac{1}{1 + T_p s} \exp -T_d s \quad (8)$$

where x is defined by Eq. (7).

Figure 5:
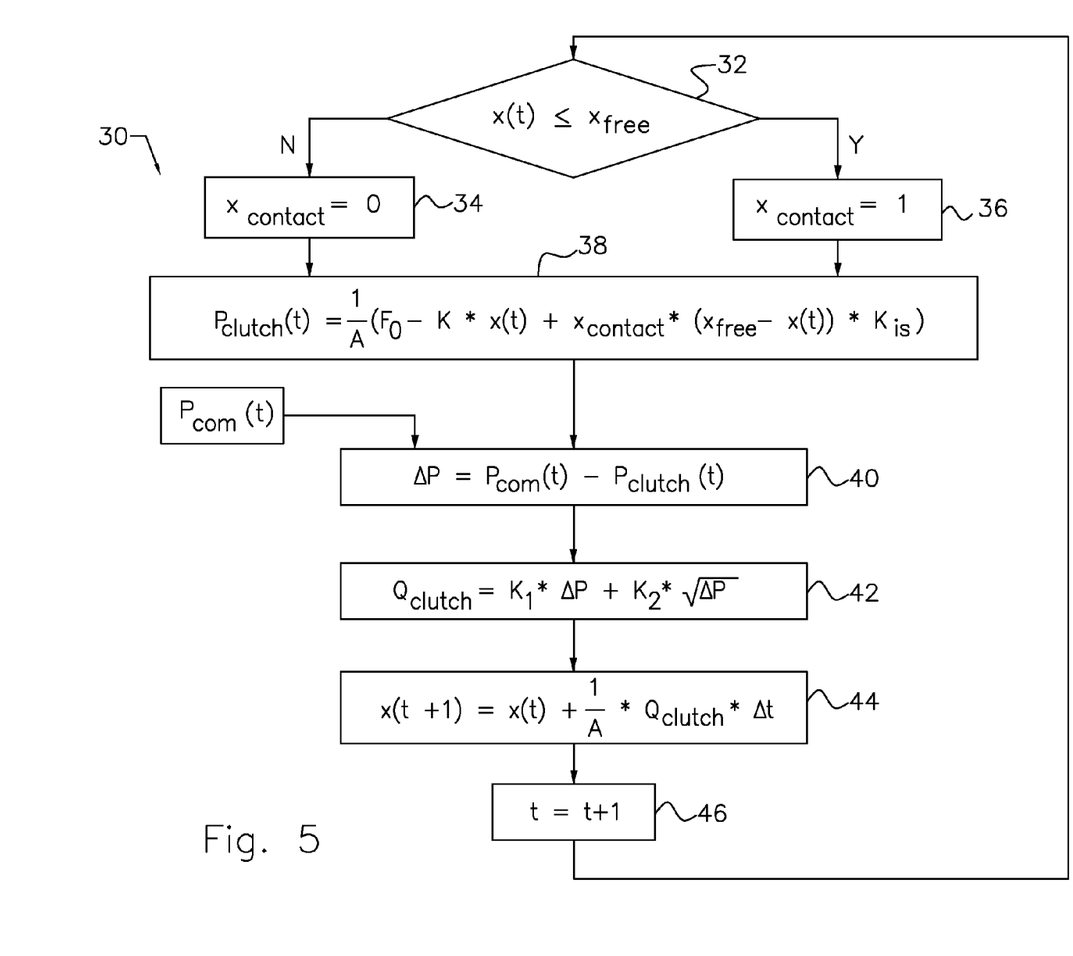
FIG. 5 is a logic diagram of an algorithm applicable to region 2 and 3.

The control algorithm 30 shown in FIG. 5 performs a test at step 32 to determine whether the piston displacement x(t) during the current execution of the algorithm (t) is equal to or less than xfree. During the first execution of the algorithm x(t) is estimated.

If the result of test 32 is true, control advances to step 34 where xcontact is set equal to 0. Otherwise, at step 36 xcontact is set equal to 1.

At step 38 the magnitude of pressure in cylinder 14 that actuates piston 12 is calculated using equation (2).

At step 40 equation (5) is used to calculate $\Delta P$. P com (t) is determined closed-loop by a PID controller on the basis of x(t).

At step 42 the flow rate of hydraulic fluid into cylinder 14 is calculated using equation (6).

At step 44 piston displacement is incremented by adding a magnitude of piston displacement calculated using equation (7) to the current piston displacement.

At step the number of the algorithm execution is incremented, and control returns to step 32.

Figure 6:
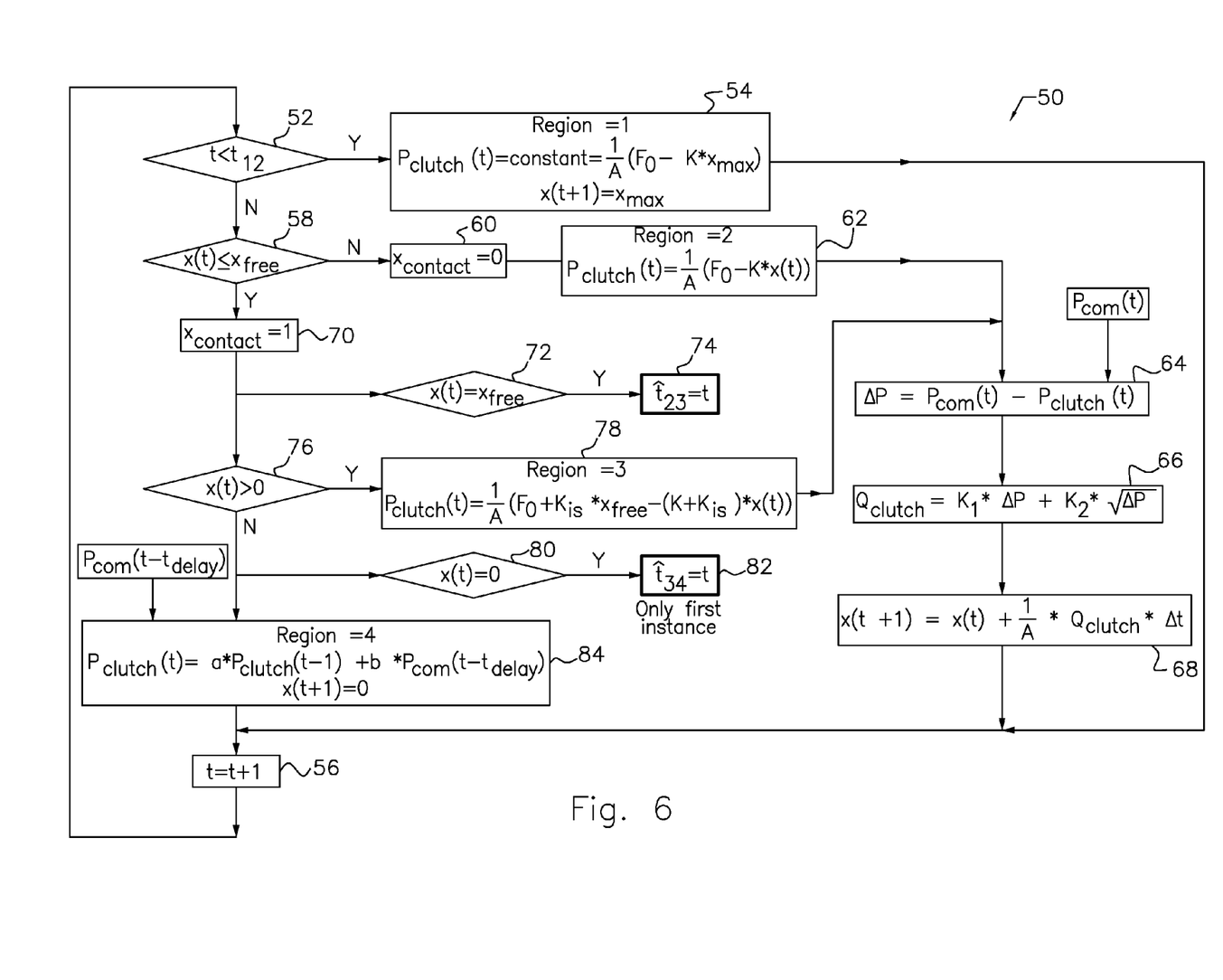
FIG. 6 is a logic diagram of an algorithm applicable to regions 1-4.

The control algorithm 50 shown in FIG. 6 performs a test at step 52 to determine whether (t) is less than the time required for piston 12 to move into region 2 from region 1. A look-up table indexed by hydraulic fluid (ATF) temperature indicates the magnitude of t12

If the result of test 52 is true, at step 54 Pclutch (t) for region 1 is calculated and piston displacement is confirmed to be equal to xmax.

Then control advances to step 56 where t is incremented and control returns to step 52.

If the result of test 52 is false, at step 58 a test is performed to determine whether piston displacement x(t) is equal to or less than xfree.

If the result of test 58 is false, at step 60 xcontact is set equal to zero, and at step 62 Pclutch (t) for region 2 is calculated using equation (2).

Then control advances to step 64 where equation (5) is used to calculate $\Delta P$. P com (t) is determined closed-loop by a PID controller on the basis of x(t).

At step 66 the flow rate of hydraulic fluid into cylinder 14 is calculated using equation (6).

At step 68 piston displacement x(t) is incremented by adding a magnitude of piston displacement calculated using equation (7) to the current piston displacement.

Then control advances to step 56 where t is incremented and control returns to step 52.

If the result of test 52 is false and the result of test step 58 is true, at step 70 xcontact is set equal to 1.

At step 72 a test is performed to determine whether x(t) is equal to xfree. If the result of test 72 is true, at step 74 an estimate of the time when piston 12 moved from region 2 into region 3 is recorded and stored in electronic memory.

At step 76 a test is performed to determine whether x(t) is greater than zero.

If the result of test 76 is true, at step 78 Pclutch is calculated and control returns to step 64 where equation (5) is used to calculate ΔP. P com (t) is determined closed-loop by a PID controller on the basis of x(t).

At step 66 the flow rate of hydraulic fluid into cylinder 14 is calculated using equation (6).

At step 68 piston displacement x(t) is incremented by adding a magnitude of piston displacement calculated using equation (7) to the current piston displacement.

Then control advances to step 56 where t is incremented again and control returns to step 52.

If the result of test 52 is false, the result of test step 58 is true, and the result of step 76 is false, at step 80 a test is performed to determine whether x(t) is equal to zero.

If the result of test 80 is true, at step 82 an estimate of the time when piston 12 first moved from region 3 into region 4 is recorded and stored in electronic memory.

At step 84, Pclutch (t) is calculated for region 4 using the equation of step 84, wherein $t_{delay}$ is the period length that passes between the controller issuing Pcom and completing the calculation of Pclutch (t) at step 84 in response to Pcom. Then control advances to step 56 where t is incremented again and control returns to step 52.

In summary, the pressure output model consists of one state: the clutch piston position, x. The model also has two main tuning parameters, $K_1$ and $K_2$, for the hydraulic actuation. There is also a time delay in the system modeled in Region 4.

Figure 7:
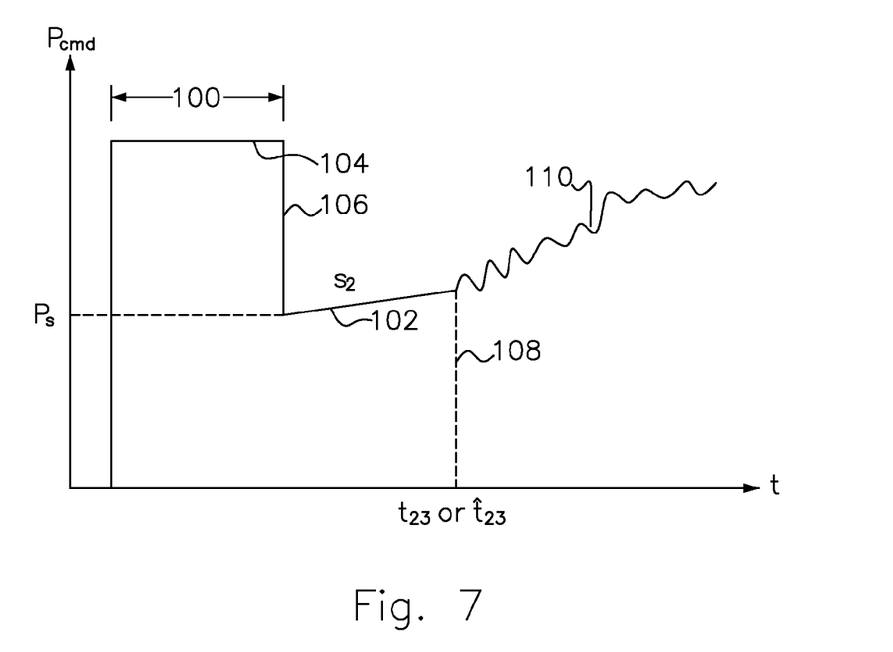
FIG. 7 is a graph showing the relation between commanded clutch pressure and time during a transmission gearshift.

Referring to FIG. 7, this clutch actuation control strategy utilizes the control-oriented clutch model of FIG. 1-4 for real-time adaptation of the boost time 100 and stroke pressure 102 "within-the-shift." The hydraulic clutch actuation model provides estimates of the clutch pressure and clutch piston position, which are used to facilitate the "within-the-shift" adaptation of the boost time and stroke pressure. The clutch model for synchronous gearshift control is used for the boost phase 100 and the estimate of the stroke pressure 102 using the estimate of the position of the clutch piston 12. The parameters Ps and s2 help shape the clutch command profile used for the open-loop control of Regions 1 and 2, where Ps is the commanded stroke pressure, and s2 is the slope of the commanded stroke pressure.

Boost Phase

A faster hydraulic transient during a gearshift is achieved by commanding initially during a brief period (boost time 100) pressure 104, which is significantly higher than desired pressure. Using the hydraulic clutch actuation model, as well as measurements or estimates of a transmission shaft torque to calculate clutch torque, allows real-time determination of when to exit the boost phase. If the boost phase duration is a calibrated value and not updated until subsequent shifts, or it is not calibrated correctly or a disturbance to the driveline occurs, the clutch can experience either an over-boost or an under-boost event, which leads to undesirable shift quality. Dynamic boost duration minimizes the possibility of these events from occurring and allows for adaptation "within-the-shift."

The dynamic structure of the boost phase control consists of an upper and lower limit. At the upper limit when t23 or t23hat (i.e., when the clutch is determined to have gained capacity either based on its estimated torque or based on the piston model transition from region 2 to 3) occurs, the boost phase stops. This is considered an upper limit to the boost phase because it prevents over-boosting from occurring, which is the maximum amount of time to boost pressure in the clutch cylinder 14. For the lower limit, a small constant epsilon_b is used to help prevent under-boosting from occurring.

The actual value of epsilon_b can be chosen either as a tolerance in the pressure domain or in the clutch piston position domain. Epsilon_b allows for some error in the determination of stroke pressure or corresponding piston position. Preferably boosting stops immediately before reaching stroke pressure, hence, epsilon_b creates this cushion. By setting a threshold under the estimated stroke pressure, it can be used as a conservative trigger to stop the boost phase.

A purpose of the boost phase is to command a high pressure 104 for as long as possible to help decrease the time spent pressurizing the hydraulic line and get close to the actual stroke pressure. Choosing a small tolerance of the expected stroke pressure creates a lower limit for the amount of boosting.

Stroke Pressure

After the boost phase 100, the stroke pressure Ps is commanded at 106. However, the stroke pressure, i.e. the pressure at which the clutch gains torque transmitting capacity, is not exactly known. In regards to stroking, there are two undesirable shift events: over-stroking and under-stroking. Over-stroking is difficult to detect with the information available on-board a production vehicle, since it is mostly noticeable via a large torque disturbance to the shaft, but other factors can also cause this behavior. Similarly, under-stroking is also difficult to detect, because it is usually evidenced by long shift times as well as overshoot in engine speed. With the hydraulic clutch actuation model, an estimate of the clutch piston 12 position is available. Using this estimate of the position of clutch piston 12, under-stroking is easily detectable. When under-stroking occurs, the clutch piston 12 starts to de-stroke, i.e., the clutch piston begins to move in the opposite direction, away from the friction plates 20, whose mutual frictional engagement is required for the gearshift. Therefore, an open-loop controller purposely initializes the commanded stroke pressure Ps to be a low value to ensure that under-stroking occurs. By monitoring when the clutch piston 12 reverses direction, the control parameter Ps quickly increases until the clutch piston begins moving in the correct direction again, i.e., toward the friction plates 20. Thus, adaptation "within-the-shift" is again achieved. The commanded stroke pressure Ps is used as a learning algorithm for the actual commanded stroke pressure of Ps.

More specifically, this under-stroking technique is used for a certain number of shifts and an average of the converged Ps values is then set as the commanded stroke pressure Ps to be used during gearshifts that occur after the Ps is adapted in this way.

After commanded stroke pressure Ps is established for the gearshift, the time rate of increase of stroke pressure slope s2 is commanded until the clutch 10 acquires torque transmitting capacity at 108. The slope s2 could be a low ramping of the clutch commanded pressure Ps to ensure the clutch piston 12 continues to stroke until the clutch gains torque capacity. Once torque transmitting capacity occurs, i.e. when t23 or t23hat are identified, the closed-loop controller takes over at 108 to control pressure 110 in cylinder 14 using the measured or estimated shaft torque and speed feedback information.

Figure 8:
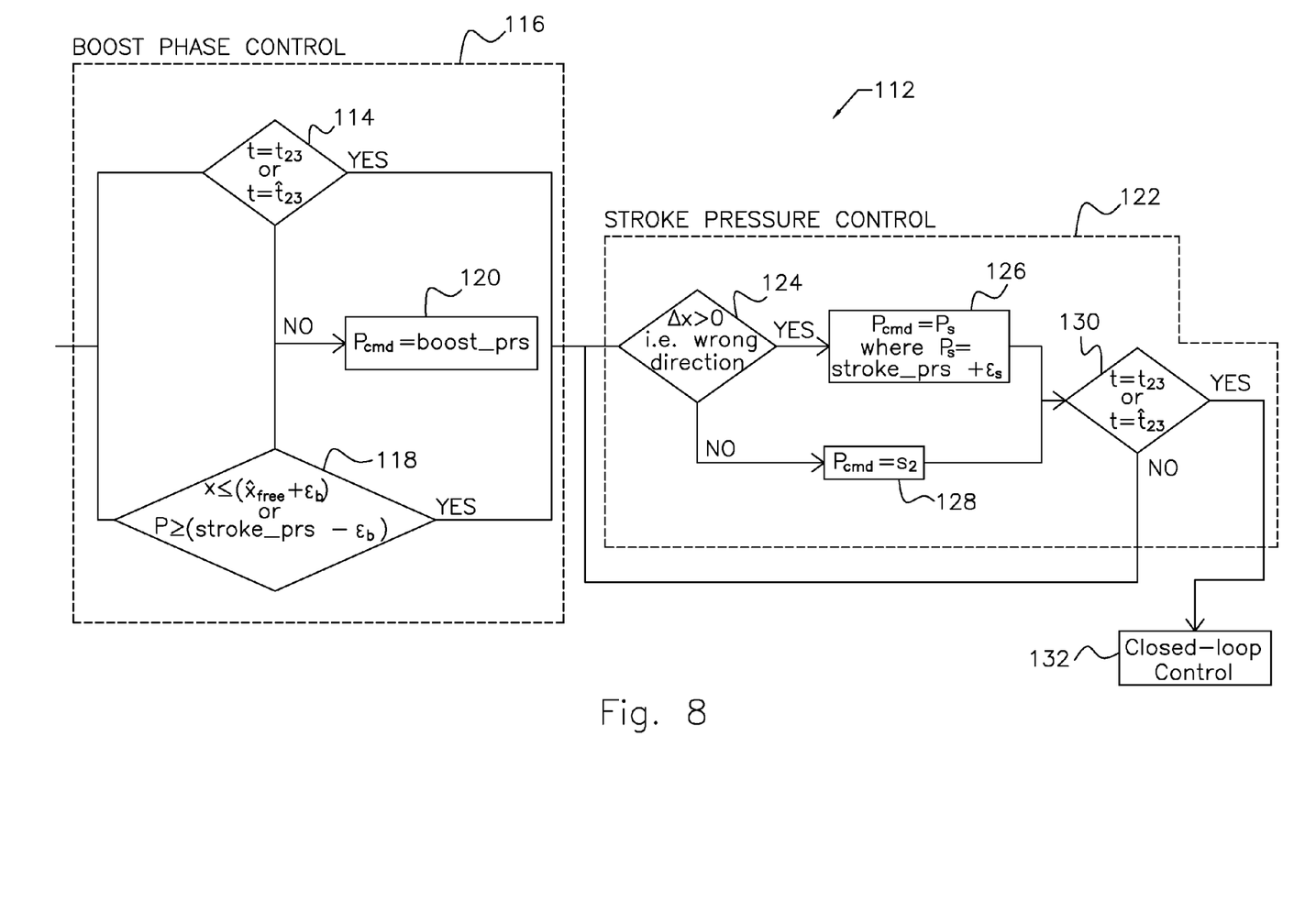
FIG. 8 is a logic diagram of an algorithm applicable to regions 1 and 2.

Referring to the logic diagram 112 of FIG. 8, at step 114 of the boost phase control 116 a test is performed to determine whether $t=t_{23}$ or whether $t=t_{23}hat$. At step 118 a test is performed to determine whether the position x of clutch piston 12 equal to or less than ($x_{free}$+epsilon_b) or whether clutch cylinder pressure P is equal to or greater than (stroke_pressure−epsilon_b).

If the result of either test 114 or 118 is logically negative, at step 120 Pcmd is set equal to boost_pressure 100.

If the result of either test 114 or 118 is logically positive, control advances to the stroke pressure control 122. At step 124 a test is performed to determine whether a change in position of clutch piston 12 is away from the friction plates 20. If the result of test 124 is positive, at step 126 commanded stroke pressure Pcmd is set equal to stroke pressure Ps, where Ps=stroke_pressure+s2.

If the result of test 124 is negative, at step 128 commanded stroke pressure Pcmd is set equal to s2.

At step 130 a test is performed to determined whether $t=t_{23}$ or whether $t=t_{23}$hat. If the result of test 130 is positive, at step 132 pressure in clutch cylinder 14 is controlled by the closed-loop controller.

If the result of test 130 is negative, control returns to step 124.

In accordance with the provisions of the patent statutes, the preferred embodiment has been described. However, it should be noted that the alternate embodiments can be practiced otherwise than as specifically illustrated and described.

The invention claimed is:

1. A method for controlling pressure applied to a piston that actuates a control element of an automatic transmission during a gearshift, comprising:
    (a) applying boost pressure to a valve controlling the piston provided one of the following conditions is present: a boost phase of the gearshift is unexpired, such pressure is less than a desired pressure, and displacement of the piston exceeds a desired displacement;
    (b) applying stroke pressure in the valve provided the piston moves toward an engaged position of the control element;
    (c) increasing stroke pressure if the piston moves toward a disengaged position of the control element.

2. The method of claim 1, comprising using closed-loop control of valve pressure provided a stroke phase expires.

3. The method of claim 2, wherein boost pressure has a greater magnitude than stroke pressure prior to closed-loop control of valve pressure occurs.

4. The method of claim 1, wherein step (a) further comprises setting upper and lower limits of a duration of the boost phase of the gearshift.

5. The method of claim 1, wherein step (a) further comprises setting upper and lower limits piston displacement in the boost phase of the gearshift.

6. A method for controlling pressure that produces piston displacement that actuates a control element of an automatic transmission during a gearshift, comprising:
    (a) applying boost pressure in a valve controlling piston displacement provided a predetermined upper limit of duration of a boost phase is unexpired;
    (b) applying stroke pressure to the valve provided the piston moves toward an engaged position of the control element;
    (c) increasing stroke pressure if the piston moves toward a disengaged position of the control element.

7. The method of claim 6, comprising using closed-loop control of valve pressure provided a stroke phase expires.

8. The method of claim 7, wherein boost pressure has a greater magnitude than stroke pressure prior to closed-loop control of the pressure occurs.

9. The method of claim 6, wherein step (a) further comprises setting upper and lower limits of a duration of the boost phase of the gearshift.

10. A method for controlling pressure that produces piston displacement for hydraulically actuating a control element of an automatic transmission during a gearshift, comprising:
    (a) applying boost pressure to a valve controlling the piston provided one of the following is present: such pressure is less than a desired pressure, and piston displacement exceeds a desired displacement;
    (b) applying stroke pressure to the valve provided piston displacement moves toward an engaged position of the control element;
    (c) increasing stroke pressure if piston displacement moves toward a disengaged position of the control element.

11. The method of claim 10, comprising using closed-loop control of the pressure provided a stroke phase expires.

12. The method of claim 11, wherein boost pressure has a greater magnitude than stroke pressure prior to closed-loop control of the pressure occurs.

13. The method of claim 10, wherein step (a) further comprises setting upper and lower limits piston displacement in a boost phase of the gearshift.

14. A method for controlling pressure producing piston displacement for actuating a control element of an automatic transmission during a gearshift, comprising:
    (a) changing boost pressure in a valve that controls piston displacement, as a position of the control element approaches an engaged position;
    (b) applying stroke pressure to the valve, provided piston displacement continues to move toward the engaged position;
    (c) increasing stroke pressure if the piston moves toward the disengaged position.

15. The method of claim 14, comprising using closed-loop control of the pressure, provided a stroke phase expires.

16. The method of claim 14, wherein boost pressure has a greater magnitude than stroke pressure prior to closed-loop control of the pressure occurs.

17. The method of claim 14, wherein step (a) further comprises setting upper and lower limits of a duration of the boost phase of the gearshift.

* * * * *